(12) United States Patent
Diamanti et al.

(10) Patent No.: US 10,585,784 B2
(45) Date of Patent: Mar. 10, 2020

(54) REGRESSION TESTING QUESTION ANSWERING COGNITIVE COMPUTING SYSTEMS BY APPLYING GROUND TRUTH VIRTUAL CHECKSUM TECHNIQUES

(71) Applicant: International Business Machines Corporation, Armonk, NY (US)

(72) Inventors: Gary F. Diamanti, Wake Forest, NC (US); Iwao Hatanaka, Acton, MA (US); Mauro Marzorati, Lutz, FL (US); William A. Mills, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 14/965,369

(22) Filed: Dec. 10, 2015

(65) Prior Publication Data
US 2017/0169354 A1    Jun. 15, 2017

(51) Int. Cl.
*G06F 11/36* (2006.01)
*G06N 5/04* (2006.01)
*G06F 16/00* (2019.01)

(52) U.S. Cl.
CPC ...... *G06F 11/3668* (2013.01); *G06F 11/3688* (2013.01); *G06F 16/00* (2019.01); *G06N 5/04* (2013.01)

(58) Field of Classification Search
CPC ........ G06N 99/005; G06N 5/041; G06N 5/02; G06N 5/04; H04L 1/00; G06F 11/00;
(Continued)

(56) References Cited

U.S. PATENT DOCUMENTS

| 6,490,696 B1 * | 12/2002 | Wood ................. G06F 11/3688 714/38.1 |
| 7,238,025 B1 | 7/2007 | Wilkerson et al. |

(Continued)

OTHER PUBLICATIONS

Breck et al., "Another Sys Called Qanda", 2000, Ninth Text REtrieval Conference, col. 500, pp. 369-378 (Year: 2000).*

(Continued)

*Primary Examiner* — Hal Schnee
*Assistant Examiner* — Brent Johnston Hoover
(74) *Attorney, Agent, or Firm* — Stephen R. Tkacs; Stephen J. Walder, Jr.; Diana R. Gerhardt (57) ABSTRACT

A mechanism is provided in a data processing system for performing regression testing on a question answering system instance. The mechanism trains a machine learning model for a question answering system using a ground truth virtual checksum as part of a ground truth including domain-specific ground truth. The ground truth virtual checksum comprises a set of test questions, an answer to each test question, and a confidence level range for each answer to a corresponding test question. The mechanism runs regression test buckets across system nodes with domain-specific corpora and receiving results from the system nodes. Each system node implements a question answering system instance of the question answering system by executing in accordance with the machine learning model and by accessing domain-specific corpora. Each test bucket includes a set of questions matching a subset of questions in the ground truth virtual checksum. The mechanism identifies regressions, inconsistencies, or destabilizations in code behavior in the system nodes based on results of comparing the results to the ground truth virtual checksum and generates a report presenting the identified regressions, inconsistencies, or destabilizations and the affected system nodes.

20 Claims, 4 Drawing Sheets

(58) Field of Classification Search
CPC .. G06F 11/30; G06F 11/3668; G06F 11/3688; G06F 17/30; Y04S 10/54
See application file for complete search history.

(56) References Cited

U.S. PATENT DOCUMENTS

| | | | |
|---|---|---|---|
| 7,528,697 | B2 | 5/2009 | Hatanaka et al. |
| 7,853,983 | B2 | 12/2010 | Abrutyn et al. |
| 8,548,231 | B2 | 10/2013 | Shet et al. |
| 8,706,653 | B2 | 4/2014 | Kasneci et al. |
| 8,726,081 | B2 | 5/2014 | Asad et al. |
| 8,726,132 | B2 | 5/2014 | Abel et al. |
| 8,805,859 | B2 | 8/2014 | Bohner et al. |
| 8,806,315 | B2 | 8/2014 | Bender et al. |
| 8,832,830 | B2 | 9/2014 | Paranjape et al. |
| 9,292,658 | B2 | 3/2016 | Ashparie et al. |
| 2006/0026152 | A1 | 2/2006 | Zeng et al. |
| 2009/0154361 | A1* | 6/2009 | Dunning ............... H04L 1/004 370/241 |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2014/0214709 | A1 | 7/2014 | Greaney |
| 2014/0272909 | A1* | 9/2014 | Isensee ............... G09B 7/02 434/362 |
| 2014/0297571 | A1 | 10/2014 | Beamon et al. |
| 2014/0298199 | A1 | 10/2014 | Johnson, Jr. et al. |
| 2014/0358922 | A1* | 12/2014 | Alkov ............ G06F 17/30598 707/737 |
| 2015/0149736 | A1* | 5/2015 | Kwon ................ G06F 3/0604 711/147 |

OTHER PUBLICATIONS

Mohler et al., "Text-to-text Semantic Similarity for Automatic Short Answer Grading", Mar. 30-Apr. 3, 2009, EACL '09 Proceedings of the 12th Conference of the European Chapter of the Association for Computational Linguistics, pp. 567-575 (Year: 2009).*

"List of IBM Patents or Patent Applications Treated as Related", Feb. 8, 2016, 2 pages.

"Ground Truth", Wikipedia, http://en.wikipedia.org/wiki/Ground_truth, downloaded from the Internet on Apr. 7, 2015, 4 pages.

Aroyo, Lora et al., "Measuring Crowd Truth for Medical Relation Extraction", The Association for the Advancement of Artificial Intelligence 2013 Fall Symposium Series, Nov. 15-17, 2008, 8 pages.

Bardis, Nikolaos, "Coding of Checksum Components for increasing the Control Reliability of Data Transmission for Military Applications", WSEAS Transactions on Communications, vol. 7 Issue 11, Nov. 2008, 10 pages.

Chen, Zheng et al., "Graph Based Clustering for Computational Linguistics: A Survey", 2010 Workshop on Graph-based Methods for Natural Language Processing, Jul. 16, 2010, 9 pages.

Gupta, Pawan K. et al., "TCP with header checksum option for wireless links: Ananalytical approach towards performance evaluation", SADHANA—Academy Proceedings in Engineering Sciences, Indian Academy of Sciences, vol. 32, Part 3, Jun. 2007, 23 pages.

High, Rob, "The Era of Cognitive Systems: An Inside Look at IBM Watson and How it Works", IBM Corporation, Redbooks, Dec. 12, 2012, 16 pages.

Iverson, David L., "System Health Monitoring for Space Mission Operations", 2008 Aerospace Conference, Mar. 1-8, 2008, Big Sky, MT, 8 pages.

Jueneman, Robert R., "Integrity Controls for Military and Commercial Applications", Fourth Aerospace Computer Security Applications Conference, Dec. 12-16, 1988, 25 pages.

Mccord, M.C. et al., "Deep parsing in Watson", IBM J. Res. & Dev. vol. 56 No. 3/4 Paper 3, May/Jul. 2012, pp. 3:1-3:15.

Nguyen, Thanh C. et al., "A Probabilistic Integrity Checking Approach for Dynamic Data in Untrusted Cloud Storage", 2013 IEEE/ACIS 12th International Conference on Computer and Information Science (ICIS), Jun. 16-20, 2013, 5 pages.

Uzuner, Ozlem et al., "Community Annotation Experiment for Ground Truth Generation for the i2b2 Medication Challenge", J Am Med Inform Assoc. Sep.-Oct. 2010; 17(5): 519-523.

Yuan, Michael J., "Watson and healthcare, How natural language processing and semantic search could revolutionize clinical decision support", IBM developerWorks, IBM Corporation, Apr. 12, 2011, 14 pages.

Zhang, Hong et al., "Dispatching Automation System Graphics File Checksum Methods", Applied Mechanics and Materials, vols. 543-547, Mar. 2014, 5 pages.

Amir, Samir et al., "CEDAR: Efficient Reasoning for the Semantic Web", IEEE, IEEE Computer Society, 2014 Tenth International Conference on Signal-Image Technology & Internet-Based Systems, Nov. 23, 2014, pp. 157-163.

Dewan, Jahangir et al., "eLearning Content Authentication Using Bipartite Matching", IEEE, IEEE Computer Society, 2013 14th ACIS International Conference on Software Engineering, Artificial Intelligence, Networking and Parallel/Distributed Computing, Jul. 1, 2013, pp. 51-55.

Lin, James C., "Cellular-Phone Radiation Effects on Cancer in Genteically Modified Mice", IEEE Antenna's and Propagation Magazine, Telecomunications Health and Safety, vol. 44, No. 6, Dec. 2002, pp. 165-168.

Miller, Christian et al., "Bounded Model Checking of Incomplete Networks of Timed Automata", IEEE, IEEE Computer Society, 2010 11th International Workshop on Microprocessor Test and Verification, Dec. 13, 2010, pp. 61-66.

* cited by examiner

| QUESTION ID | ANSWER ID | CONFIDENCE LEVEL RANGE | RESPONSE TIME RANGE |
|---|---|---|---|
| | | | |

*FIG. 5A*

| QUESTION ID | ANSWER ID | CONFIDENCE LEVEL RANGE | RESPONSE TIME RANGE |
|---|---|---|---|
| | ANSWER ID 1 | CONFIDENCE LEVEL RANGE 1 | RESPONSE TIME RANGE 1 |
| | ANSWER ID 2 | CONFIDENCE LEVEL RANGE 2 | RESPONSE TIME RANGE 2 |
| | ANSWER ID 3 | CONFIDENCE LEVEL RANGE 3 | RESPONSE TIME RANGE 3 |

REGRESSION TESTING QUESTION ANSWERING COGNITIVE COMPUTING SYSTEMS BY APPLYING GROUND TRUTH VIRTUAL CHECKSUM TECHNIQUES

BACKGROUND

The present application relates generally to an improved data processing apparatus and method and more specifically to mechanisms for regression testing question answering cognitive computing systems by applying ground truth virtual checksum techniques.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft® and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Regression testing is a type of software testing that seeks to uncover new software bugs, or regressions, in existing functional and non-functional areas of a system after changes such as enhancements, patches or configuration changes, have been made to them. The purpose of regression testing is to ensure that changes such as those mentioned above have not introduced new faults. One of the main reasons for regression testing is to determine whether a change in one part of the software affects other parts of the software. Common methods of regression testing include rerunning previously completed tests and checking whether program behavior has changed and whether previously fixed faults have re-emerged. Regression testing can be performed to test a system efficiently by systematically selecting the appropriate minimum set of tests needed to adequately cover a particular change.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing regression testing on a question answering system instance. The method comprises training a machine learning model for a question answering system using a ground truth virtual checksum as part of a ground truth including domain-specific ground truth. The ground truth virtual checksum comprises a set of test questions, an answer to each test question, and a confidence level range for each answer to a corresponding test question. The method further comprises running regression test buckets across system nodes with domain-specific corpora and receiving results from the system nodes. Each system node implements a question answering system instance of the question answering system by executing in accordance with the machine learning model and by accessing domain-specific corpora. Each test bucket includes a set of questions matching a subset of questions in the ground truth virtual checksum. The method further comprises identifying regressions, inconsistencies, or destabilizations in code behavior in the system nodes based on results of comparing the results to the ground truth virtual checksum and generating a report presenting the identified regressions, inconsistencies, or destabilizations and the affected system nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In complex cognitive question answering systems of today, one of the key operational challenges is the difficulty in determining performance and functionality of the system and its critical components. To adequately assess the functionality of a complex question answering system, it is necessary to ask the system a known question to validate how the system responds to this inquiry. To have a scalable and repeatable health checking solution, an optimal approach would be to ask each system the same question and receive the same answer and confidence level for that answer within an expected response time interval. However, this is very difficult when performing testing, such as regression testing, on hundreds or thousands of instances. The instances may have different customer domains, and there would be no way to introduce a common test question to address the multitude of diverse domains.

One possible implementation for performing regression testing on a question answering cognitive systems is to require each customer to explicitly upload, pre-process, and ingest a specific document for the customer's corpora. This approach may be error-prone, because the customer may forget to include the required document or the customer may use the incorrect version of the required document, for example. Also, due to the ingestion of customer-specific content relevant for the customer's domain, a question in one customer's system may not yield the same answer or confidence level as another customer's system. This approach is not feasible when one must perform regression testing for hundreds or thousands of instances, all of which may have unique customer-maintained corpora.

Another possible solution is to introduce a periodic health check of the system. The periodic health check may detect the general running status of the system; however, it may or may not properly provide coverage/execution of specific components of the question answering system. For instance, the system as a whole may be up, but the question answering system may not be able to answer questions with required confidence levels due to component-specific failures. Some question answering systems may allow for accuracy test runs to be executed in a generic manner using experiments; however, this approach leverages customer-specific answer keys and question sets with the corresponding domain corpora and machine learning models. One cannot ask the same question and receive a predictable answer for each question answering system instance across hundreds or thousands of systems.

The illustrative embodiments provide a mechanism for performing regression testing on domain-specific question answering systems in a repeatable and scalable manner. The mechanism for deploying a scalable regression testing system to work with domain-specific question answering systems centers around a baseline ground truth "virtual checksum." This virtual checksum is comprised of a predefined set of question and answer pairs, response characteristics, and metadata that are encoded into common system corpora accessible by all customer environments. Once seeded among the system corpora, the virtual checksum can be leveraged to perform regression testing by exercising the desired logic paths throughout the entire system.

One may choose the question and answer pairs such that they tailor the logic paths to support end-to-end flows for availability and tailor specific logic paths and flows for aspects such as performance monitoring. If the mechanism encounters unexpected behavior, the mechanism triggers a checksum event to alert that the system did not respond appropriately so that an operations team may take action. These checksum events can cover a variety of scenarios from heartbeat pings to machine learning model training or regression testing.

Due to the ingestion of customer-specific content relevant to the customer's domain, a question in one customer's system may not yield the same answer, confidence level, or metadata in another customer's system. This is where flexibility of the virtual checksum comes into play. The response for a virtual checksum consists of several critical pieces of known, predefined metadata, such as the answer to the question, the answer identifier, the system response time range, and the confidence rating range of the answer. This unique signature is created by concatenating these attributes, which provides a unique key to the system's performance. This approach also provides flexibility to the implementer in customizing which subsystems and/or software engines, also referred to as annotators or annotation engines, to exercise in the question answering system. In addition, the implementer may choose to configure the system to disable external visibility of the virtual checksum and its associated data to the end user.

The goal of the regression testing approach of the illustrative embodiment is execute code coverage (both breadth and depth) against new product versions/patches across the system components in a scalable, repeatable manner, regardless of corpora domain or corpora version. By deploying the ground truth virtual checksum with domain-agnostic machine learning models (trained with domain-agnostic question and answer keys), one can run regression test buckets across all system nodes with domain-specific corpora to identify regressions, inconsistencies, or destabilization in the code behavior of new or modified deployed product versions.

This regression testing approach with virtual checksum would allow for exercising end-to-end, mainline code paths of the QA system pipeline as well as facilitating code coverage tests across additional pipeline code paths, such as Topic Answer Oriented (TAO) processing components to comprehensively verify the integrity of all deployed systems in a domain-agnostic way.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
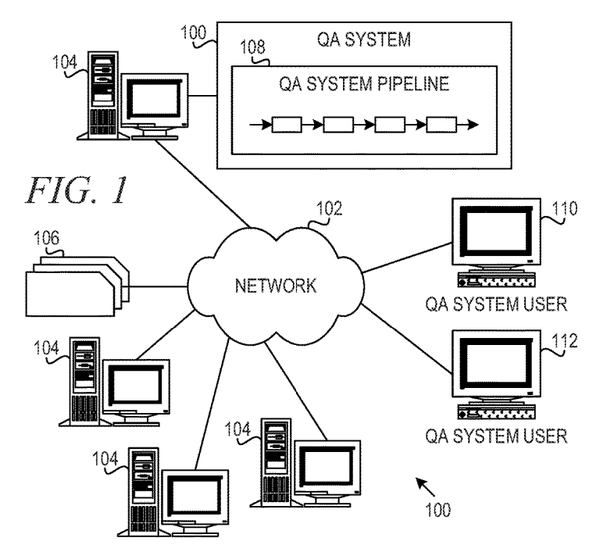
FIG. 1 depicts a schematic diagram of one illustrative embodiment of a question answering (QA) system in a computer network.
Figure 2:
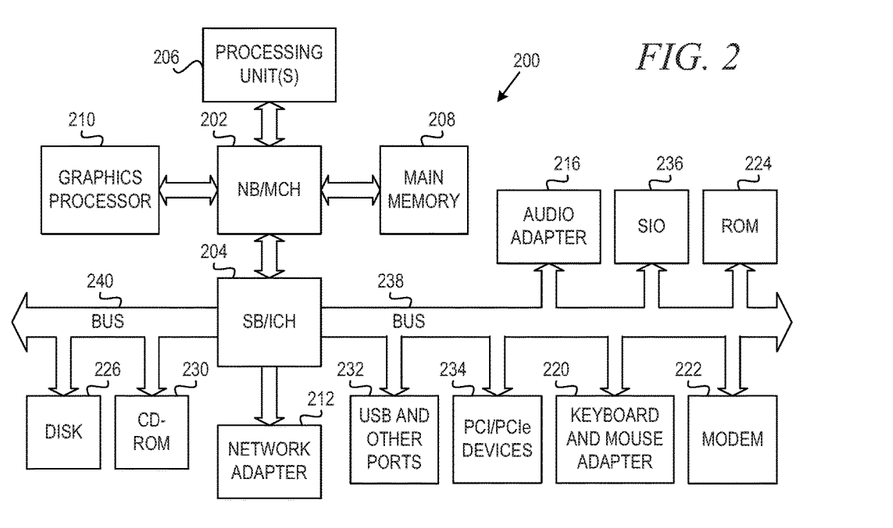
FIG. 2 is a block diagram of an example data processing system in which aspects of the illustrative embodiments are implemented.
Figure 3:
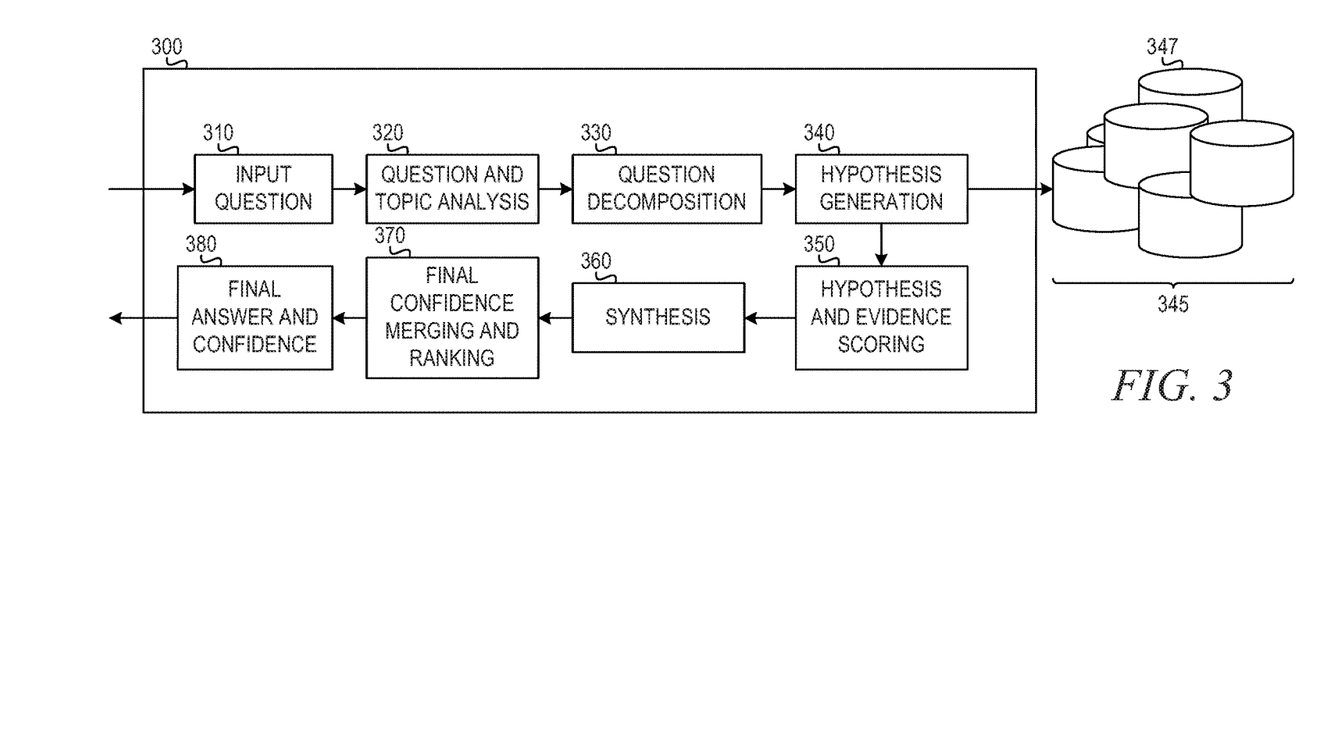
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to regression testing question answering cognitive computing systems by applying ground truth virtual checksum techniques.

Thus, it is important to first have an understanding of how a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering cognitive system (QA system) is an artificial intelligence application executing on data processing hardware that answers questions pertaining to a given subject-matter domain presented in natural language. The QA system is a cognitive system operating in accordance with a QA machine learning model. The QA system receives inputs from various sources including input over a network, a corpus of electronic documents or other data, data from a content creator, information from one or more content users, and other such inputs from other possible sources of input. Data storage devices store the corpus of information. A content creator creates content in a document for use as part of a corpus of information with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. The QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. QA system pipeline 108 is made up of many software engines or components, also referred to as annotators, annotation engines, or reasoning algorithms, each performing a different function. The QA system pipeline 108 generates answers for the input question based on the processing of the input question and the corpus of data 106 by the combination of software engines or components. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e., candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not, ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion," These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
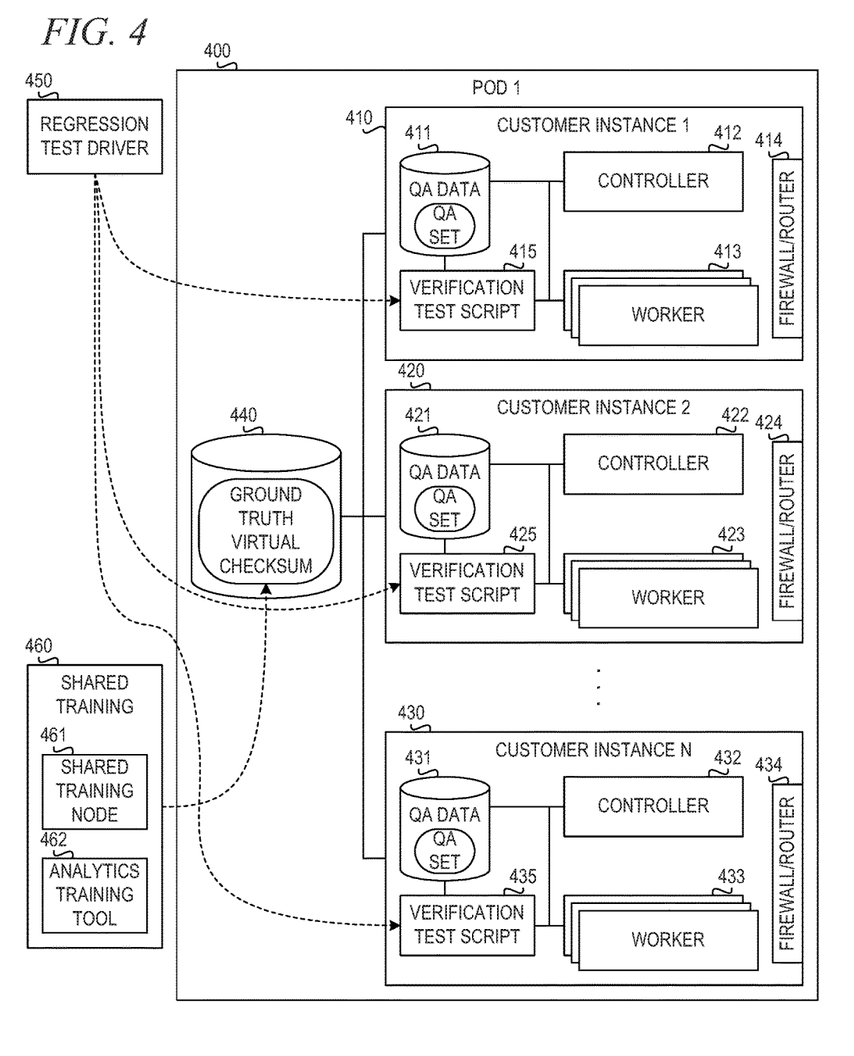
FIG. 4 is a block diagram illustrating a system for regression testing question answering cognitive computing systems by applying ground truth virtual checksum techniques in accordance with an illustrative embodiment.

FIG. 4 is a block diagram illustrating a system for regression testing question answering cognitive computing systems by applying ground truth virtual checksum techniques in accordance with an illustrative embodiment. FIG. 4 depicts an example of how a hosting environment could be laid out to house multiple customer instances with all associated required supporting infrastructure. In addition, the illustrated embodiment demonstrates how a question answering (QA) system can implement domain-agnostic regression testing by exercising various subsystems to gauge performance and accuracy.

In the depicted example, the question answering cognitive computing system includes point of deployment 1 (POD 1) 400; however, in practice, there may be many points of deployment. POD 1 includes customer instance 1 410, customer instance 2 420, . . . , and customer instance N 430. Common shared library 440 stores a ground truth virtual checksum system that can be deployed to facilitate system health monitoring and verification in a highly scalable and comprehensive manner. Common shared library 440 may be accessed by each customer instance 410, 420, 430, thus providing common ground truth for customer instances 410, 420, 430 such that the customer instances are expected to provide the same answer to the questions in the ground truth virtual checksum despite the domain-specific corpora. Also, the artifacts of the virtual checksum system in common library 440 can be accessed by any of the domains and subsequently leveraged as the foundation for implementing domain-agnostic regression testing in question answering systems, such as customer instances 410, 420, 430.

Customer instance 1 410 includes a set of compute nodes, which include a controller node 412 and multiple worker nodes 413. Customer instance 1 410 also includes firewall/router 414. A private encrypted file system 411 is the repository for the customer's unique corpora. Common shared library 440 hosts the shared code binaries/artifacts with access provided for each of the instances 410, 420, 430. The ground truth virtual checksum can be deployed in common corpora artifacts for any domain and subsequently leveraged as the foundation for implementing domain-agnostic regression testing in question answering systems. These common corpora artifacts are deployed as a question and answer set stored in file system 411 and verification test script 415. The question and answer set comprises a set of questions designed to exercise the desired software components of the QA system pipeline and a virtual checksum for each question.

Similarly, customer instance 2 420 includes private encrypted file system 421, controller compute node 422, worker compute node 423, and firewall/router 424. The common corpora artifacts are deployed in customer instance 2 420 as a question and answer set stored in file system 421 and verification test script 425. Customer instance N 430 includes private encrypted file system 431, controller compute node 432, worker compute node 433, and firewall/router 434. The common corpora artifacts are deployed in customer instance N 430 as a question and answer set stored in file system 431 and verification test script 435.

The shared training environment 460 facilitates the creation of analytic models to calculate confidence levels that the QA systems have for their candidate answers. The shared training environment 460 consists of a shared training node 461 that serves as the compute infrastructure for an analytics training tool 462 to create and train the machine learning models. Examples of training software are Statistical Package for the Social Sciences (SPSS) from IBM and Enterprise Miner from SAS.

Regression test driver 450 executes code coverage (both breadth and depth) against new product versions/patches across the system components in a scalable, repeatable manner, regardless of corpora domain or corpora version. By deploying the ground truth virtual checksum with domain-agnostic machine learning models (trained with domain-agnostic question and answer keys), regression test driver 450 runs regression test buckets across all system nodes with domain-specific corpora to identify regressions, inconsistencies, or destabilization in the code behavior of new or modified deployed product versions.

Regression test driver 450 accesses verification test scripts 415, 425, 435 to implement domain-agnostic regression testing while exercising various subsystems to gauge performance and accuracy.

An example implementation flows as follows:

1) Create a sample test question to be used to health check the environment.

2) Run the question on a test system in the same environment to validate the metadata responses.

3) Embed the test question and the ground truth virtual checksum in a well-known/defined area in the common corpora artifacts of the shared library 440.

4) Enable regression test driver 450 to begin querying the system. This could be via a cron job or any applicable method of scheduling.

5) When regression test driver 450 triggers, it calls the verification test script, such as verification test script 415 in customer instance 1 410.

6) Verification test script 415 retrieves a designated question from the QA set in file system 411 and calls the question answering (QA) application programming interface (API) (not shown) of controller node 412 and worker nodes 413 to ask the designated question and exercise the desired software engines of the QA system instances.

7) The QA pipeline of each QA system instance returns the results of the query to the verification test script 415.

8) The verification test script 415 compares the results returned by the QA pipelines to the ground truth virtual checksum stored with the question.

9) If the results match for worker node 413, for example, the verification test script 415 notifies regression test driver 450 that the QA system in worker node 413 is fully functional. If the results do not match, the verification test script 415 interprets the virtual checksum and returns an error code to regression test driver 450.

10) Regression test driver 450 can then send an alert to the operations team (not shown) notifying them that the specific instance, e.g., worker node 413, needs attention, before it impacts the end user.

11) Regression test driver 450 may also generate a report detailing the identified regressions, inconsistencies, or destabilizations, as well as the QA system instances affected.

Figure 5A:
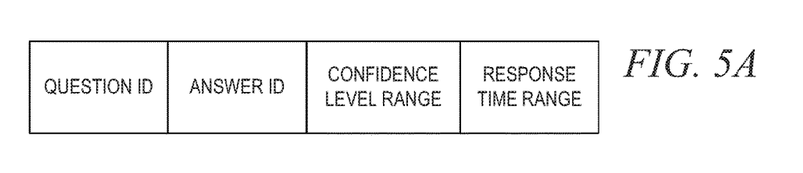
FIG. 5A is a diagram depicting components of a ground truth virtual checksum in accordance with an illustrative embodiment.

FIG. 5A is a diagram depicting components of a ground truth virtual checksum in accordance with an illustrative embodiment. In the depicted example, the ground truth virtual checksum is a four-value n-tuple, or quadruple, comprising a question identifier, an answer identifier, a confidence level range, and a response time range. The question identifier is the question identification number of a designated question from a question and answer set, which is designed or selected to exercise desired software engines in the QA system pipeline. The answer identifier is the answer identification number of the expected answer. The confidence level range is the acceptable range for the answer confidence level. The response time range is the acceptable range for receiving the response. The virtual checksum may include other performance metrics in place of or in addition to the response time range.

The health check servlet submits the question corresponding to the question identifier in the virtual checksum to a QA system instance and receives a response from the QA system instance. The response includes an answer identifier, a confidence value, and a response time value. The verification test script compares the answer identifier, the confidence value, and the response Lime value received from the QA system instance to the values in the ground truth virtual checksum. Based on the comparison, the verification test script determines whether the QA system instance is active, responding, and behaving properly.

Figure 5B:
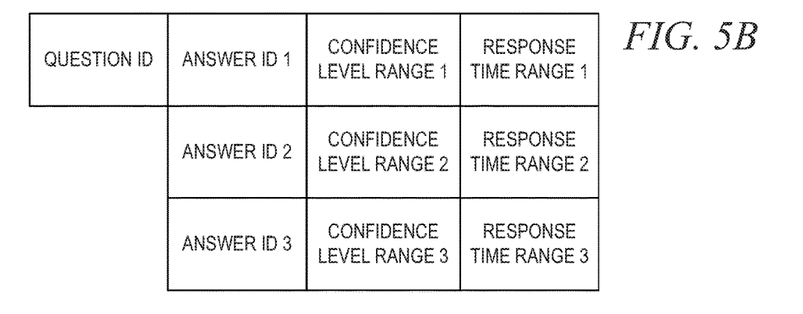
FIG. 5B is a diagram depicting components of a ground truth virtual checksum as a multi-dimensional n-tuple in accordance with an illustrative embodiment.

FIG. 5B is a diagram depicting components of a ground truth virtual checksum as a multi-dimensional n-tuple in accordance with an illustrative embodiment. In the depicted example, the ground truth virtual checksum comprises a question identifier and a plurality of three-value n-tuples, each comprising an answer identifier, a confidence level range, and a response time range. The question identifier is the question identification number of a designated question from a question and answer set, which is designed or selected to exercise desired software engines in the QA system pipeline. The answer identifier is a candidate answer identification number of an expected candidate answer. The confidence level range is the acceptable range for the answer confidence level for a given candidate answer. The response time range is the acceptable range for receiving the response for a given candidate answer. The virtual checksum may include other performance metrics in place of or in addition to the response time range.

The health check servlet submits the question corresponding to the question identifier in the virtual checksum to a QA system instance and receives a response from the QA system instance. The response includes a ranked set of candidate answers, each having an answer identifier, a confidence value, and a response time value. The verification test script compares the answer identifier, the confidence value, and the response time value for each candidate answer received from the QA system instance to the values in the ground truth virtual checksum. Based on the comparison, the verification test script determines whether the QA system instance is active, responding, and behaving properly.

The multi-dimensional n-tuple approach provides flexibility in the verification of system responses by allowing a set of acceptable answers with characteristics defined at answer-specific granularity. In one embodiment, a client application checks against each component of the ground truth virtual checksum to validate the expected responses and detects any errors or problematic system conditions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions fir carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
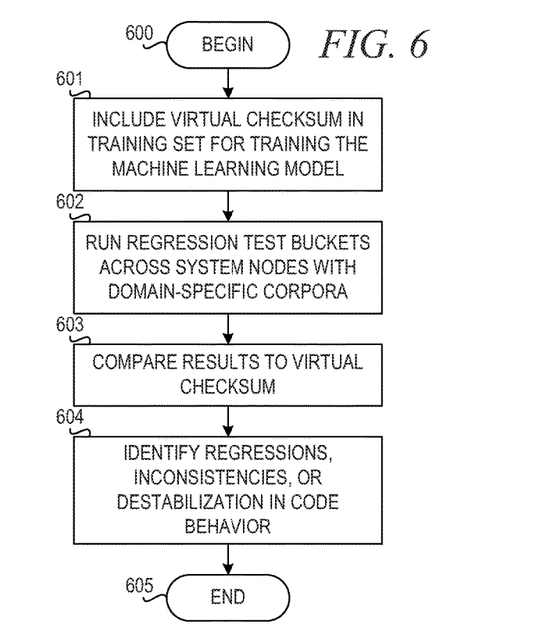
FIG. 6 is a flowchart illustrating operation of a system for regression testing question answering cognitive computing systems by applying ground truth virtual checksum techniques in accordance with an illustrative embodiment.

FIG. 6 is a flowchart illustrating operation of a system for regression testing question answering cognitive computing systems by applying ground truth virtual checksum techniques in accordance with an illustrative embodiment. Operation begins (block 600), and the system includes the ground truth virtual checksum in the training set for training the machine learning model (block 601). The system runs regression test buckets across system nodes with domain-specific corpora (block 602). The system compares results to the virtual checksum (block 603). The system then identifies regressions, inconsistencies, or destabilization in code behavior (block 604). Therefore, operation ends (block 605). The system may also generate a report detailing the identified regressions, inconsistencies, or destabilizations, as well as the QA system instances affected The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing regression testing on a question answering system instance, the method comprising:

training a machine learning model for a question answering system using a ground truth virtual checksum as part of a ground truth including domain-specific ground truth, wherein the ground truth virtual checksum comprises a set of test questions, an answer to each test question, and a confidence level range for each answer to a corresponding test question;

storing the ground truth virtual checksum in a common shared library accessible to a regression test driver and a plurality of system nodes;

storing a set of questions matching a subset of questions in the ground truth virtual checksum in a private file system of each of the plurality of system nodes;

running, by the regression test driver, regression test buckets across the plurality of system nodes with domain-specific corpora and receiving results from the system nodes, wherein each system node implements a question answering system instance of the question answering system by executing in accordance with the machine learning model and by accessing domain-specific corpora associated with each question answering system instance and wherein each test bucket includes the set of questions; and identifying, by the regression test driver, regressions, inconsistencies, or destabilizations in code behavior in the system nodes based on results of comparing result answers and result confidence values receive from the question answering system instances to the ground truth virtual checksum; and generating, by the regression test driver, a report presenting the identified regressions, inconsistencies, or destabilizations and the affected system nodes.

2. The method of claim 1, wherein running test buckets across system nodes comprises calling a test script in a given system node to retrieve a designated question from a designated test bucket, submit the designated question to the question answering system instance at the given system node, and receive a result answer result a confidence value from the question answering system instance.

3. The method of claim 2, wherein the ground truth virtual checksum further comprises a performance metric value range for each test question.

4. The method of claim 3, wherein the performance metric value range comprises a response time range.

5. The method of claim 3, wherein the question answering system instance returns a result performance metric value and wherein identifying regressions, inconsistencies, or destabilizations comprises comparing the result answer, the result confidence value, and the result performance metric value to the ground truth virtual checksum.

6. The method of claim 2, wherein the ground truth virtual checksum is a multi-dimensional ground truth virtual checksum comprising a question identifier and a plurality of three-value n-tuples, each comprising an answer identifier, a confidence level range, and a response time range.

7. The method of claim 6, wherein the question answering system instance returns a plurality of candidate answers, each having an associated answer identifier, confidence value, and performance metric value, and wherein identifying regressions, inconsistencies, or destabilizations comprises comparing the answer identifier, confidence value, and performance metric value of the plurality of candidate answers the ground truth virtual checksum.

8. The method of claim 1, wherein each test question is selected to exercise, predefined components of a question answering pipeline of the question answering system instance.

9. A computer program product comprising a computer readable storage medium having a computer readable program stored therein, wherein the computer readable program, when executed on a computing device, causes the computing device to:

train a machine learning model for a question answering system using a ground truth virtual checksum as part of a ground truth including domain-specific ground truth, wherein the ground truth virtual checksum comprises a set of test questions, an answer to each test question, and a confidence level range for each answer to a corresponding test question;

store the ground truth virtual checksum in a common shared library accessible to regression test driver and a plurality of system nodes;

store a set of questions matching a subset of questions in the ground truth virtual checksum in a private file system of each of the plurality of system nodes;

run, by the regression test driver, regression test buckets across system nodes with domain-specific corpora and receiving results from the system nodes, wherein each system node implements a question answering system instance of the question answering system by executing in accordance with the machine learning model and by accessing domain-specific corpora associated with each question answering system instance and wherein each test bucket includes the set of questions; and identify, by the regression test driver, regressions, inconsistencies, or destabilizations in code behavior in the system nodes based on results of comparing result answers and result confidence values received from the question answering system instances to the ground truth virtual checksum; and generate, by the regression test driver, a report presenting the identified regressions, inconsistencies, or destabilizations and the affected system nodes.

10. The computer program product of claim 9, wherein running test buckets across system nodes comprises calling a test script in a given system node to retrieve a designated question from a designated test bucket, submit the designated question to the question answering system instance at the given system node, and receive a result answer and a result confidence value from the question answering system instance.

11. The computer program product of claim 10, wherein the ground truth virtual checksum further comprises a performance metric value range for each test question.

12. The computer program product of claim 11, wherein the performance metric value range comprises a response time range.

13. The computer program product of claim 11, wherein the question answering system instance returns a result performance metric value and wherein identifying regressions, inconsistencies, or destabilizations comprises comparing the result answer, the result confidence value, and the result performance metric value to the ground truth virtual checksum.

14. The computer program product of claim 10, wherein the ground truth virtual checksum is a multi-dimensional ground truth virtual checksum comprising a question identifier and a plurality of three-value n-tuples, each comprising an answer identifier, a confidence level range, and a response time range.

15. The computer program product of claim 14, wherein the question answering system instance returns a plurality of candidate answers, each having an associated answer identifier, confidence value, and performance metric value, and wherein identifying regressions, inconsistencies, or destabilizations comprises comparing the answer identifier, confidence value, and performance metric value of the plurality of candidate answers to the ground truth virtual checksum.

16. The computer program product of claim 9, wherein each test question is selected to exercise predefined components of a question answering pipeline of the question answering system instance.

17. An apparatus comprising:

a processor; and a memory coupled to the processor, wherein the memory comprises instructions which, when executed by the processor, cause the processor to:

train a machine teaming model for a question answering system using a ground troth virtual checksum as part of a ground truth including domain-specific ground truth, wherein the ground truth virtual checksum comprises a set of test questions, an answer to each test question, and a confidence level range for each answer to a corresponding test question;

store ground truth virtual checksum in a common shared library accessible to a regression test driver and a plurality of system nodes;

store a set of questions matching a subset of questions in the ground truth virtual checksum in a private file system of each of the plurality of system nodes;

run, by the regression test driver, regression test buckets across system nodes with domain-specific corpora and receiving results from the system nodes, wherein each system node implements a question answering system instance of the question answering system by executing in accordance with the machine learning model and by accessing domain-specific corpora associated with each question answering system instance and wherein each test bucket includes the set of questions; and identify, by the regression test driver, regressions, inconsistencies, or destabilizations in code behavior in the system nodes based on results of comparing result answers and result confidence values received from the question answering system instances to the ground truth virtual checksum; and generate, by the regression test driver, a report presenting the identified regressions, inconsistencies, or destabilizations and the affected system nodes.

18. The apparatus of claim 17, wherein running test buckets across system nodes comprises calling a test script in a given system node to retrieve a designated question from a designated test bucket, submit the designated question to the question answering system instance at the given system node, and receive a result answer and a result confidence value from the question answering system instance.

19. The apparatus of claim 18, wherein the ground truth virtual checksum further comprises a performance metric value range for each test question.

20. The apparatus of claim 18, wherein the ground truth virtual checksum is a multi-dimensional ground truth virtual checksum comprising a question identifier and a plurality of three-value n-tuples, each comprising an answer identifier, a confidence level range, and a response time range.

* * * * *